United States Patent [19]

Rittler

[11] Patent Number: 4,777,206

[45] Date of Patent: Oct. 11, 1988

[54] ARTICLE OF MANUFACTURE COMPOSED OF GEL

[75] Inventor: Hermann L. Rittler, Corning, N.Y.

[73] Assignee: Corning Glass Works, Corning, N.Y.

[21] Appl. No.: 37,034

[22] Filed: Apr. 10, 1987

Related U.S. Application Data

[60] Division of Ser. No. 848,791, Apr. 7, 1986, Pat. No. 4,676,929, which is a continuation-in-part of Ser. No. 742,954, Jun. 10, 1985, abandoned.

[51] Int. Cl.$^4$ .................. B01J 13/00; C04B 35/14; C08K 3/34
[52] U.S. Cl. .................. 524/445; 162/152; 252/62; 252/313.1; 252/315.2; 252/315.5; 252/378 R; 428/210; 428/921; 430/567; 501/148
[58] Field of Search ............ 252/315.2, 315.5, 62, 252/378 R; 501/148; 430/567; 524/445

[56] References Cited

U.S. PATENT DOCUMENTS

| | | | |
|---|---|---|---|
| 2,531,427 | 11/1950 | Hauser | 252/315.2 X |
| 3,325,340 | 6/1967 | Walker | 162/3 X |
| 4,083,956 | 4/1978 | Shelton | 424/68 X |
| 4,350,605 | 9/1982 | Hughett | 252/309 X |
| 4,472,538 | 9/1984 | Kamigaito et al. | 428/407 X |
| 4,517,112 | 5/1985 | Mardis et al. | 252/315.2 |
| 4,670,366 | 6/1987 | Wu | 430/567 X |
| 4,676,929 | 6/1987 | Rittler | 252/315.2 |

OTHER PUBLICATIONS

W. R. Sorenson et al.: "Preparative Methods of Polymer Chemistry", Interscience Publishers, Inc., New York, 1961, p. 237.

Primary Examiner—Richard D. Lovering
Attorney, Agent, or Firm—Clinton S. Janes, Jr.

[57] ABSTRACT

There are disclosed gels composed of hydrated phyllosilicates combined with a lattice expanding agent selected from the group consisting of a primary aminocarboxy acid, lysine orotate, and glycylglycine. Both organic and inorganic additions, as well as ion exchange products, are disclosed. The gels, with or without the additions, may be polymerized and may be formed or shaped. Also disclosed are methods for generating the gels and for treating the gels generated.

11 Claims, 2 Drawing Sheets

ARTICLE OF MANUFACTURE COMPOSED OF GEL

CROSS REFERENCE TO RELATED APPLICATIONS

This application is a division of Ser. No. 848,791, filed Apr. 7, 1986 now U.S. Pat. No. 4,676,929, which, in turn, was a continuation-in-part of Ser. No. 742,954, filed June 10, 1985, now abandoned.

INTRODUCTION

This invention is concerned with useful gels generated from expandable, hydrated sheet silicates, also known as lattice layered silicates, or phyllosilicates. It is also concerned with articles of manufacture produced by further treatment of such gels, and with methods of generating and treating the gels. The silicate minerals of interest include vermiculite, beidellite, nontronite, volchonskoite, saponite, stevensite, sauconite, pimelite, bentonite, montmorillonite, hectorite, the smectites, attapulgite, sepiolite, phlogopite and biopyrobole; i.e., in essence the entire genus of hydrated or hydratable phyllosilicates whether of natural or synthetic origin.

The three layer micas in general, and natural vermiculite in particular, have been extensively studied because of their potential for thermal resistance and electrical insulation. The interest has heightened considerably with the recent flight from asbestos products.

The term "vermiculite" refers to, and identifies, a specific mineral species. However, it is typical of, and may here be read as referring to, any hydratable, layer latticed, expandable silicate structure, primarily the three layer micas. The silicate layer units in these minerals have a thickness of about 10 Angstrom (Å) units, with the main elemental constituents being Mg, Al, Si, and O. These silicate layers are separated by an interlayer composed of water molecules associated with cations, such as $Mg^{++}$, $Ca^{++}$, $Na^+$, $K^+$, and $H^+$.

In order to create a product from vermiculite, it is usually necessary to delaminate the particles. This involves separating the crystals at the interlayer to form high aspect ratio platelets. These may be suspended as a gel and subsequently deposited in any desired form, such as a sheet, or otherwise processed.

At one time, it was standard practice to heat vermiculite particles to an elevated temperature. This caused the water-containing interlayer to expand and pop open. Later, it was learned that vermiculite could be expanded by reflux treatment with various salts in aqueous solution. Thereafter, application of an intense shearing force to the expanded particles causes them to separate at the interlayer and form a gel.

It has been suggested that ion exchange takes place in the interlayer during salt treatment. This may occur on standing for an extended time, but usually refluxing, or similar heat treatment, for several hours is prescribed.

RELATED LITERATURE

U.S. Pat. No. 3,325,340 (Walker et al.) describes a process for producing an aqueous suspension of vermiculite flakes which comprises treating crystals of vermiculite with a selected alkyl ammonium, lithium, lysine, or ornithine cation in an aqueous solution, immersing the crystals in water to promote swelling normal to the main cleavage plane, and subjecting the swollen crystals to intense mechanical shearing to form a stable suspension. Examples prescribe heating or refluxing for several hours in the solution of cation salt followed by immersion for a matter of hours to swell.

U.S. Pat. No. 3,434,917 (Kraus et al.) discloses a similar method wherein vermiculite ore is successively exposed to sodium chloride and lithium chloride salt solutions, then immersed in water to swell, and finally subjected to intense mechanical shearing to form platelets. A specific example prescribes steeping the ore in salt solution for 24 hours.

United Kingdom Patent Specification Nos. 1,593,382 and 1,593,383 disclose methods in which vermiculite is exposed to a salt of sodium, lithium, or an organo-substituted ammonium cation, followed by aqueous treatment and intense shearing action. The suspension thus produced may be washed, filtered, and then shaped against a mold as water is removed.

U.S. Pat. No. 4,305,992 (Langer et al.) discloses an intumescent sheet composed in part of unexpanded vermiculite flakes which have been ion exchanged with an ammonium ion. The patent also refers to several patents as showing thermal exfoliation of vermiculite.

U.S. Pat. No. 3,356,611 (Walker et al.) discloses treating vermiculite to render it dispersible in an organic medium. The treatment is ion exchange with a substituted ammonium, phosphonium, or sulphonium cation, the substituent being a saturated or unsaturated aliphatic chain, a polyoxyethylene chain, and/or an aromatic or heterocyclic ring.

A publication by Isaac Barshad, in *Soil Science Society Proceedings* 1952, pages 176–182 and entitled "Factors Affecting the Interlayer Expansion of Vermiculite and Montmorillonite with Organic Substances," indicates that the determining factors are size, charge and total amount of the interlayer cations, magnitude of the dipole moment, and the dielectric constant of the immersion liquid. Alcohols, ketones, ethers, amino acids, and aromatics such as benzene were among the immersion liquids studied. There is no indication of gel formation.

PURPOSES OF THE INVENTION

A basic purpose is to provide a gel composed of a unique combination of materials. Another purpose is to provide a stable gel that can be stored for a period of time before usage.

A further purpose is to provide a gel that can be further treated, either physically or chemically, to provide a formable material.

A still further purpose is to provide a gel that can be flocculated by an ion exchange.

A further purpose is to provide a gel into which a further organic or inorganic material may be added to form a composite with the silicate.

A still further purpose is to provide a material having an organic component and being resistance to deterioration at elevated temperatures.

Another purpose is to provide an organic-silicate composite that can be thermally polymerized.

A further purpose is to provide a simple, inexpensive method of rapidly delaminating a layered silicate.

Another purpose is to provide a method for delaminating a layered silicate that is effective in a matter of minutes without application of heat.

A further purpose is to provide a method for delaminating a layered silicate wherein the delaminating agent may be substantially recovered.

SUMMARY OF THE INVENTION

In furtherance of these purposes and others that will become apparent from the following description, the present invention comprehends a gel consisting essentially of one or more of the primary aminocarboxy acids and/or lysine orotate and/or glycylglycine combined with one or more delaminated, hydrated or hydratable phyllosilicates, said phyllosilicates being characterized in having a lattice or unit cell expandable by a primary aminocarboxy acid, and/or by lysine orotate, and/or by glycylglycine, at least a portion of said primary aminocarboxy acid and/or lysine orotate and/or glycylglycine being intercalated in the phyllosilicate. The cell expanding agent is most generally used in a polar liquid, most conveniently a water solution. However, it may also be employed in the dry state, if desired. The invention further comprehends shaped articles, such as molded bodies and films, produced from the gel.

The instant invention is also embodied in a method of producing a gel from a hydrated or hydratable phyllosilicate, said phyllosilicate being characterized by a lattice or unit cell expandable through contact with a primary aminocarboxy acid and/or lysine orotate and/or glycylglycine, which comprises combining the phyllosilicate with at least one cell expanding agent selected from the group of a primary aminocarboxy acid, lysine orotate, and glycylglycine to expand the lattice of the silicate and then separating the expanded silicate at the interlayer thereof. The separation is faciliated by applying a shearing force thereto.

Beta-alanine is the preferred primary aminocarboxy acid and can be recovered or recycled from polar liquid solutions through centrifugation or dialysis. The phyllosilicate of most interest is natural vermiculite which may be separated as a sheet or film, may be pressed or spray dried, may be subjected to dielectric drying, or may be flocculated for further processing.

In one preferred embodiment, a further inorganic or organic component is added to the gel before separation. In the case of organics, this may be a polymerizable material which, in amounts up to about 20% of the product, permits producing a composite material having unusual thermal resistance.

GENERAL DESCRIPTION OF THE INVENTION

The present invention provides a gel which, in its simplest form, is composed of a selected, hydrated or hydratable phyllosilicate dispersed in an expanding agent which may be a primary aminocarboxy acid, or lysine orotate, or glycylglycine, either in dry form or in a polar liquid solution thereof. It further provides a quick and easy method of producing such a gel.

It is based on my discovery that, unlike prior expanding agents employed, the indicated agents will cause expandable layered phyllosilicates to swell in a matter of minutes at ambient temperature, that is, without application of heat. It is further based on my observations that not only the expanding agent, but also other materials present in the gel, may enter the lattice structure and become intercalated therein, that is, be held in the structure when the phyllosilicate is reconstituted.

The layered phyllosilicates may be synthetic, that is, reaction sintered or melted and crystallized, or may be a natural raw material. For economic reasons, the latter are usually preferred.

The phyllosilicates thus far found to be expandable by the above-indicated agents include the natural hydrateable phyllosilicate materials vermiculite, beidellite, nontronite, volchonskoite, saponite, stevensite, sauconite, pimelite, hectorite, bentonite, sodium montmorillonite, sepiolite, phylogopite, biopyrobole and attapulgite. In addition to the corresponding synthetic materials, synthetic alkaline earth micas and polylithionites are also operative. The natural materials are three layer, expanding lattice type phyllosilicates characterized by silicate layers separated by an interlayer containing $H_2O$ and metal cations ($Mg^{++}$, $Ca^{++}$, $K^+$, $Na^+$ and $Fe^{+++}$). The silicate layer is actually composed of two tetrahedral layers, composed essentially of silica+ alumina, separated by an octahedral layer usually containing Mg, Fe, Al, Li and OH or F ions.

It will be appreciated that mixtures of the expandable phyllosilicates may be employed in order to tailor certain properties. For example, a chain-like structure such as sepiolite may be mixed with a platelet structure such as vermiculite.

The effective expanding agents for present purposes are the primary aminocarboxy acids, an aromatic modification known as lysine orotate, and a secondary amino derivative known as glycylglycine. The aminocarboxy acids are characterized by an amino($-NH_2$) group and a carboxy group ($-COOH$) separated by a primary alkyl chain composed of methylene groups. The lysine orotate is a modification involving an aromatic ring structure intermediate. N-glycylglycine is the simplest of all peptide structures and is commonly used in the synthesis of much more elaborate polymeric structures.

Lattice or unit cell expansion proceeds very rapidly where the expanding agent is present in a polar liquid solution, such as water. Hence, the application of a low energy source of shearing action, for example, the force of a food blender, will suffice to very quickly separate the silicate platelets and form a gel. Consequently, in those situations where other factors are equal, an aqueous solution of a selected cell expanding agent will customarily be employed.

It can be appreciated, however, that the inclusion of water or other polar liquid, will require the eventual removal of the liquid from the final product. The removal of the liquid adds another step in the stream of production, commonly a heating procedure to volatilize the liquid. Accordingly, it may be desirable to conduct the lattice expansion in a non-liquid environment. Where such is the case, the present invention contemplates the simple combination of dry expanding agent, i.e., at least one of the above-designated expanding agents, with a phyllosilicate. A cell expansion from about 14 Å to about 20 Å or higher will still occur in less than one hour under normal circumstances. This will produce an anhydrous powder capable of being molded and subsequently polymerized when heated with or without the addition of other species, e.g., melamine, capable of being polymerized.

Quaternary ammonium silanes have been found to enhance the expanding function of the aminocarboxy acids. However, they were ineffective when used alone, that is, in the absence of a primary aminocarboxy acid.

It is also possible to enhance the expansion function by using a combination or mixture of aminocarboxy acids. This may be observed as a more rapid expansion, particularly in materials such as sepiolite or montmorillonite which tend to react slowly when a single acid is used. Likewise, when a mixture of acids is employed, subsequent polymerization rates are enhanced, and the process may, in some instances, be observed at ambient temperature.

Whereas amino acids containing up to 12 methylene groups have proven to be operable, short alkyl chain amino acids are preferred, both because they are less expensive and because they introduce less carbon and hydrogen, thus improving thermal resistance. The preferred acids have an alkyl chain of 1-8 carbon atoms. Among these are glycine, beta-alanine, 4-aminobutyric, 5-aminovaleric, 6-aminocaproic and 8-aminocaprylic acids. These acids may be used in combination with such long chain acids as aminoundecanoic and aminododecanoic acids to permit condensation polymerizations of polymers similar to nylon 6, 10, 11, etc. These acids are also characterized as exhibiting high dipole moments. However, this does not appear to be the sole reason for their effectiveness, since other materials with higher dipole moments have proven ineffective.

It is my belief that the effective aminocarboxy acids are capable of rapid hydration-ion exchange in the interlayer of the silicate crystals. This exchange causes the lattice to swell or enlarge to an extent of at least up to 20 Å which separates the silicate layers so that a minimal shearing force can delaminate them and generate the desired gel.

The currently preferred method consists of immersing about 10% by weight of vermiculite in an aqueous solution of beta-alanine that is about 3 molar. The latter is selected because it is capable of subsequent polymerization, cross-linking, poly-peptide, silanation, and co-polymerization processes, as well as serving as a precursor material for inorganic phase assemblages.

Prior to immersion of the silicate, the pH of the aqueous solution may be adjusted as desired from acidic to basic or to the isoelectric point, 6.0 in the case of beta-alanine. The silicate is then added and the mixture agitated for a short time, commonly 2-5 minutes. The agitation may be in a Waring blender, or other relatively low energy, shear-type mixer. This produces a fluid gel which may then be passed through a fine screen, e.g., 270 or 350 mesh, to remove coarse particles which are believed to originate from contaminants in the raw materials.

I have found that phyllosilicate gels, produced as herein described, will flocculate when dispersed in either distilled or tap water. The floc thus formed is excellent for wet screen paper making. Hand sheets produced in this manner demonstrated good strength and flexibility.

I have found that the gels of this invention will also flocculate when dispersed in a wide variety of solutions. These include the alkali metal chlorides, ammonium chloride, and chlorides of Ba, Mg, Ca, Cu, Fe and Al. Further, alkali or alkaline earth solutions of acetates, nitrates, phosphates, and hydroxides are also effective.

The largest and hardest floc particles are obtained by dispersing the gel into an aluminum chloride solution. When film or paper is made from such floc and heated above 180° C., the chloride ion volatilizes as HCl, leaving vermiculite-containing, ion-exchanged aluminum. These are durable materials with useful electrical properties.

In an alternative procedure, the flocculated gel is separated, rinsed to remove excess flocculating salt, and partially dried, if necessary, before shaping. Formed material or bodies may be produced by pressing, rolling, and injection or extrusion molding. Preferably, a small amount of a lubricating agent, such as stearic acid or methyl cellulose, is added to facilitate shaping.

Where ion exchange occurs, as for example with $AlCl_3$ and with the several potassium salt solutions, it is believed $Ca^{++}$ ion can be removed under acidic conditions and can remain in place under basic conditions to form interesting inorganic phases such as $Ca(PO_3)_2$ or $Mg(PO_3)_2$ when the pottassium ion ($K^+$) exchanges with the interlayer $Ca^{++}$ and $Mg^{++}$. Thus, when a vermiculite gel is dispersed into a water glass ($K_2O$-$SiO_2$) solution, a reaction occurs and the reaction product can be formed into a strong film or a hard cementitious article. Subsequent low-temperature heat treatment may be expected to encase the potassium-mica in a glassy matrix of a soda lime glass nature, the interlayer magnesium and calcium ions having been exchanged out of the mica.

It will be appreciated that a variety of low-cost fillers may be incorporated in the potassium mica-water glass material prior to thermal setting. Such materials as fly ash, sand, calcite, feldspars, and nepheline syenite are contemplated. Once set and dried, the resulting body may be decorated or coated in known manner.

An interesting photosensitive material may be produced by a silver ion exchange. Thus, a gel according to the invention may be poured into a silver ion-containing solution, for example, an aqueous solution of silver nitrate. The flocculated gel may then be dewatered on a screen and dried on a hot drum. When paper, produced in this manner, is exposed to ultra-violet radiation and heated to about 480° C., a dark grey-black colored paper is obtained. Photosensitive darkening is also observed from exposure to a mercury arc lamp.

While flocculated materials, with or without ion exchange, are of great interest, one of the interesting attributes of the present gels is their ability to be used directly from the gel state. Thus, the gel, after screening to remove large contamination particles, may then be centrifuged to remove the bulk of the delaminating agent. This may be on the order of 80% or even more. The concentrated gel may then be reslurried in water, or organic solvents, any desired additions made, and the material ratio adjusted, as by centrifuging, to satisy subsequent processing needs, the material solids content varying between about 25% and 75%. The rheology of the material at this point can be made to correspond to toothpaste. This is appropriate for extrusion, compression, or injection molding. The solids' content may be further reduced by organic or aqueous additions, thus adapting it to spray drying or hot calendering to form sheets.

It will be appreciated that normal additions, such as fibers, fine particulate material, and webs, may be made. Also, organic or inorganic species may be incorporated via solution chemistry.

After the material has been pressed, or otherwise molded, volatile solvents may be removed in vacuum or by heating. The material may then be further heated to effect polymerization and cross linking of residual polymeric species. Additional heating to temperatures ranging from 100° to 800° C. produces relatively more rigid materials. While many organic and inorganic materials may be added to impart unique properties, the washed gels are capable of polymerization without further additions. The level of residual organic is usually below 20% and can be lowered to ~0.5 weight percent via dialysis or centrifugation with only the residual acid present.

The herein designated aminocarboxy acids, lysine orotate, and glycylglycine appear to be unique in their ability to quickly generate a stable silicate gel from layered silicates. However, almost any organic or inorganic material of ionic nature may be employed as a secondary expansion agent. For example, secondary dipoles, including both carboxy and sulfoxy amino acids, may be employed. These include sarcosine, 3,5 diaminobenzoic acid, m-aminobenzoic acid, p-aminohippuric acid, octadecylamine, taurine and sulfanilic acid. While these materials function very slowly, or not at all, by themselves, they tend to augment the primary agents in expanding the lattice.

A wide range of other organic materials may be incorporated in the gels to participate in such reactions as esterification, polymerization, cross-linking, silanation, and co-polymerization. The organic additives may be either aliphatic or aromatic in nature. For example, addition of alcohols, such as methanol or glycerol, will lead to esterification of the carboxy acids. Likewise, carboxylic and dicarboxylic acids, aldehydes, silanes, silicones, and ketones may be added for reactive purposes. Surfactants may be added if desired in further processing operations, such as pressing, as may waste liquors from pulp making.

Where it is desired to produce a polymerized product of modified properties, almost any polymerizable material or agent may be incorporated. These include melamine, guanidine, amides, diamides, tertiary and quaternary amines, aromatic amides, silanols, caprolactams, epoxides, phenolics, polyesters, polyvinyls, acrylates, methacrylates, acrylamides, polysulfones, stearates, citrates, acetates, cyanates, nitrates, carbonates, sulfates, borates, and acid and basic phosphates.

As a result, I have found it possible to produce polymerized materials having flame resistance. Thus, film and sheet materials that resist burning at temperatures up to 600° C., and even to 800° C. in some instances, can be produced. Such heat- and flame-resistant materials are of interest in many areas. In particular, they hold considerable potential for combustion engine parts.

In the area of inorganics, various acids, such as phosphoric, boric and hydrochloric, and bases, such as hydroxides of Na, K and Li, may be present. In addition, solutions of a wide variety of metal halides, including the alkali metal chlorides, chlorides of iron, chromium, cobalt, nickel, niobium and aluminum, and ammonium fluoride may be added. As filler materials, such inorganic minerals as sand, talc, calcite, alumina, glasses, fly ash, zironcia, various sols of $SiO_2$, $Al_2O_3$, $ZrO_2$, and graphite, may be present as well as synthetic inorganic glasses, glass-ceramics, and ceramics.

It appears that once the lattice has been entered and expanded by an above-designated expanding agent, the several other materials mentioned above tend to follow into the unit cell and, because of their size, may cause further expansion. Various pieces of evidence indicate that the materials position themselves between, and attach to, the silicate layers. Thus, the process is one of intercalation of the organic and/or inorganic additives into the lattice or unit cell and between the silica layers.

It is believed the enhanced thermal resistance of polymerized organics is occasioned by such intercalation. Thus, the additives, and the polymers that form therefrom, are found, in part at least, in the lattice where they are protected when the delaminated phyllosilicate reconstitutes. This can be of particular significance in the case of organic dyes and colorants that tend to fatigue or destabilize otherwise.

DESCRIPTION OF SPECIFIC EMBODIMENTS

The invention is further disclosed and illustrated with reference to several specific examples. In the examples containing a primary aminocarboxy acid, the acid was generally a three molar (3M) or six molar (6M) aqueous solution unless otherwise indicated. The two carbon chain acid was usually preferred and is designated by its common name, beta-alanine. In all cases involving a solution of expanding agent, unless indicated otherwise, the layered silicate material and the expanding agent solution were introduced at ambient temperature into a device that imparted a low energy shear force for 2 to 5 minutes. An ordinary domestic or kitchen blender was customarily employed.

The silicate was examined, both before and after delamination to produce a gel, by a low angle, x-ray diffraction (LAXRD) apparatus. The equipment used was a standard Philips vertical powder diffraction goniometer equipped with one-fourth degree divergence and receiving slits and a 0.1 degree scatter slit. The raw data were smoothed by a digital filter after fast fourier deconvolution.

Peaks in the curves generated indicated spacing in the lattice. Thus, changes in positioning and height of the peaks indicated changes in spacing in the lattice. Accordingly, for each gel produced, the two spacings observed are recorded, the difference representing the effect of the agent in opening up the structure for delamination and lattice expansion.

EXAMPLE 1

Ten (10) grams of a South African vermiculite were combined in a shear mixer with 100 ml of 3M beta-alanine and the mixture agitated for at least two (2) minutes. The material showed a lattice spacing of 12.65 Angstrom Units (Å) before delaminating and a spacing of 32.1 Å after treatment.

EXAMPLE 2

The procedure of Example 1 was repeated, except that eight (8) grams of vermiculite were combined with 100 ml. of 6M beta-alanine. The original lattice spacing of 12.65 Å was expanded to 35.3 Å, as shown by the low angle, x-ray diffraction measurements.

EXAMPLE 3

The procedure of Example 1 was repeated, except that the beta-alanine was replaced by 100 ml. of 3M 5-aminovaleric acid. Measurements showed the lattice was expanded from the original 12.65 Å to 35.3 Å.

EXAMPLE 4

The procedure of Example 1 was repeated with the beta-alanine solution replaced by a 12.5% aqueous solution of lysine orotate, a primary aminocarboxy acid having both an alkyl chain and a benzene ring in its structure. This produced a stable gel, and measurements showed the original vermiculite lattice spacing expanded to 25.96 Å.

EXAMPLE 5

The procedure of Example 1 was repeated with the beta-alanine solution replaced by an aqueous solution of 3M glycine. This produced a stable gel in which the original 12.65 Å lattice spacing was expanded to 27.6 Å.

EXAMPLE 6

The procedure of Example 1 was repeated with the beta-alanine solution replaced by an aqueous solution of 3M 6-aminocaproic acid. This produced a stable gel wherein the original lattice spacing was expanded to 31.6 Å.

EXAMPLE 7

The procedure of Example 1 was repeated with the beta-alanine solution replaced by an aqueous solution of 1.5M 8-aminocaprylic acid. This produced a stable gel in which the original 12.65 Å lattice spacing was expanded to 58.8 Å.

EXAMPLE 8

The procedure of Example 1 was repeated with the beta-alanine solution being replaced by a 3M polyaminocarboxy acid solution, that is, a solution of a plurality of primary aminocarboxy acids. This produced a stable gel wherein the original lattice spacing was expanded to about 63.05 Å as shown by LAXRD measurements. As the gel stood in a beaker, polymerization could be seen to start along the wall of the beaker.

EXAMPLE 9

Ten (10) grams of a South African vermiculite were combined in a shear mixer with 100 ml. of an aqueous solution of 3M beta-alanine and one ml. of a quaternary ammonium silane available from the Dow-Corning Corporation, Midland, Mich. under the designation XZ-2-2300. The lattice of the vermiculite was shown by low angle, x-ray diffraction to have been expanded to 63 Å.

EXAMPLE 10

The procedure of Example 9 was repeated, except that the phyllosilicate material was phlogopite and 2 ml. of the quaternary ammonium silane were added with the 3M beta-alanine. Diffraction data showed a substantial portion of the phlogopite lattice spacing of 10 Å before treatment was expanded to 44.14 Å.

EXAMPLE 11

The procedure of Example 9 was repeated, except that the beta-alanine was omitted and the vermiculite was sheared in an aqueous solution of the quaternary ammonium silane. Disintegration occurred but no gel formation. No lattice expansion was observed.

EXAMPLE 12

Eight (8) grams of natural hectorite were combined in a shear mixer with 100 ml. of 3M beta-alanine and the mixture agitated for two minutes. The pre-treatment lattice spacing of 13.28 Å in the hectorite was expanded to 17.69 Å.

EXAMPLE 13

Ten (10) grams of a fibrous phyllosilicate, sepiolite, were combined in a shear mixer with 100 ml. of the 3M polyamino acid solution of Example 8, and the mixture agitated for two minutes. A stable gel resulted, although an expansion of the lattice was not observed in LAXRD measurements, possibly due to a different manner of expansion. A portion of the gel was poured out on a plate and dried in the ambient environment. The film formed was flexible and had a ductile, slightly elastic nature.

EXAMPLE 14

Eight (8) grams of bentonite were combined with 100 ml. of a 6M beta-alanine aqueous solution in a shear mixer and agitated for two minutes. The lattice spacing of 12.62 Å was expanded to 18 Å.

EXAMPLE 15

The procedure of Example 14 was repeated, except that a phyllosilicate, known either as attapulgite clay or polygorskite, was used. The normal lattice spacing of 10.57 Å was expanded to 19.6 Å.

EXAMPLE 16

One gram of a purified sodium montmorillonite, available from R. T. Vanderbilt under the designation Veegum T, was combined with 100 ml. of 3M beta-alanine in a shear mixer and agitated a few minutes. The normal lattice spacing of 11.5 Å was expanded to 13.6 Å. It was also of interest that the gel dried on a plate to a transparent film.

Examples 17, 18 and 19 are based on the use of synthetic phyllosilicates, that is, materials melted and crystallized in the manner described in U.S. Pat. No. 4,239,519 (Beall et al.). As formed, these synthetic materials are fluorinated and show no lattice spacing. However, when hydrolyzed, a spacing is observed, and that spacing is expanded by acid treatment with an expanding agent as shown.

EXAMPLE 17

Ten (10) grams of synthetic hectorite were combined in a shear mixer with 100 ml. of 6M beta-alanine and agitated for up to five minutes. The lattice spacing in the hydrolyzed material was 12.4 Å and this was expanded to 18 Å.

EXAMPLE 18

Ten (10) grams of a synthetic strontium mica were combined with 100 ml. of an aqueous solution of 3M beta-alanine in a shear mixer and agitated for up to five minutes. The hydrolyzed lattice spacing of 15.5 Å was expanded to 21.5 Å.

EXAMPLE 19

The procedure of Example 18 was repeated employing ten (10) grams of synthetic sodium montmorillonite instead of strontium mica. The hydrolyzed lattice spacing of 12.3 Å was expanded to 17.7 Å.

EXAMPLE 20

An experiment was designed to determine the potential for aminocarboxy acid recovery. A test gel was produced by dispersing ten (10) grams of vermiculite in 100 ml. of 6N beta-alanine and pouring the mix into 2N HCl. This was followed by several separations in a centrifuge and washing. Analysis of the vermiculite gel after four washes showed the amino acid content to be down to <0.031%.

For comparison a direct dialysis treatment was applied. After only three (3) changes of water, the amino acid content was down to less than one ppm. Thus, either technique may be used for acid recovery.

EXAMPLES 21–28

A study was made to determine the wide variety of polymerized materials that can be produced by additions to the gel produced by this invention. For this purpose five (5) liter lots of gel were produced by adding natural vermiculite flakes to 3M beta-alanine to provide about 10% solids. The mix was subjected to a shear action in a blender for 5 to 10 minutes to produce a stable gel. The gel was screened through a 270 mesh screen to remove all solids over 44 microns diameter, and then centrifuged to a 30% solids' value. At this point aliquots were taken from a gel lot and a different addition made to each.

Several hundred separate material studies have been made. TABLE 1 sets forth representative examples in terms of the materials combined. "Solids" represents vermiculite in the gel, "H2O" the water content, and "additive" the material and amount added.

TABLE 1

| Ex. | Solids (gms.) | H$_2$O (ml.) | Additive |
|---|---|---|---|
| 21 | 4 | 60 | 10 ml. 10% 4-amino-benzoic/CH$_3$COOH. |
| 22 | 4 | 70 | 1 ml. 33% E-caprolactam/2N HCl |
| 23 | 4 | 70 | 1 ml. 50% E-caprolactam/H$_2$SO$_4$ |
| 24 | 8 | — | 0.8 ml. 1M C$_3$H$_6$N$_6$/HCHO |
| 25 | 4 | — | 2 ml. Nylon 6 in HCOOH |
| 26 | 8 | — | 0.1 gm. polyvinyl acetate/100 ml. methanol. |
| 27 | 8 | 100 | 5 ml. octylamine |
| 28 | 4 | 60 | 10 ml. 33% E-Caprolactam/2NHCl |

Each of the mixtures shown in composition form in Table 1 was placed on a surface and heat treated in accordance with standard polymerization practice. The heat treating schedule for each example is shown in hours and temperature in °C. in Table 2.

TABLE 2

| Ex. | Time (hrs.) | Temp. (°C.) | Time (hrs.) | Temp. (°C.) |
|---|---|---|---|---|
| 21 | 1 | 100 | 1 | 400 |
| 22 | 1 | 100 | 5 | 375 |
| 23 | 1 | 100 | 5 | 375 |
| 24 | 1 | 100 | 1½ | 250 |
| 25 | 1 | 100 | 1½ | 250 |
| 26 | 1 | 100 | 1½ | 250 |
| 27 | 1 | 100 | 2 | 400 |
| 28 | 2 | 800 | — | — |

At completion of the indicated heat treatments, the polymerized product was a hard solid having a visual appearance as shown in Table 3.

TABLE 3

| Ex. | Appearance |
|---|---|
| 21 | medium grey, smooth, crystals visible |
| 22 | light grey, very smooth |
| 23 | grey-brown, dull surface |
| 24 | grey-beige, rough surface |
| 25 | light grey, smooth surface |
| 26 | light grey, blistered surface |
| 27 | smooth, grey brown, some blisters |
| 28 | light beige brown, rough |

EXAMPLES 29–34

Gel samples taken from the five liter lots described above in Examples 21–28 were substantially diluted to provide gels containing 4, 6 or 8 parts solids. Various additives were then incorporated into the gel samples to intercalate with the silicate layers separated by the acid. Each resulting mixture was poured onto a flat surface and subjected to a polymerizing thermal treatment. This produced a film which was stripped from the surface for a tensile strength measurement in psi.

Table 4 shows the sample number, gel solids in parts/hundred, and the intercalated additive. Table 5 shows the polymerization schedule in hours and temperature in °C.

Table 6 shows the resulting film thickness (Thick) in inches and tensile stress (TS) in psi.

TABLE 4

| Sample | Gel Solids | Additive |
|---|---|---|
| 29 | 4 | 5 ml. 0.1 M K$_2$Cr$_2$O$_7$. |
| 30 | 4 | 5 ml. 0.1 M (NH$_4$)$_2$ HPO$_4$ |
| 31 | 4 | 1 ml. 2M HCl |
| 32 | 4 | 5 ml. 0.1 M (NH$_4$)$_2$ HPO$_4$ |
| 33 | 8 | 100 ml. H$_2$O |
| 34 | 8 | — |

TABLE 5

| Sample | 1st heat | 2nd heat |
|---|---|---|
| 29 | 1 hr. at 100° C. | 1 hr. at 250° C. |
| 30 | 1 hr. at 100° C. | 1 hr. at 400° C. |
| 31 | 1 hr. at 100° C. | 1 hr. at 250° C. |
| 32 | 4 hrs. at 600° C. | — |
| 33 | 1 hr. at 100° C. | 1 hr. at 250° C. |
| 34 | 1 hr. at 100° C. | ½ hr. at 400° C. |

TABLE 6

| Sample | Thick (in.) | TS (psi) |
|---|---|---|
| 29 | 0.006 | 6247 |
| 30 | 0.005 | 6124 |
| 31 | 0.004 | 5732 |
| 32 | 0.004 | 5705 |
| 33 | 0.006 | 5042 |
| 34 | 0.008 | 6205 |

EXAMPLES 35–40

In order to illustrate the synergistic effect between the expandable phyllosilicates and the primary aminocarboxy acids, a series of experiments was performed using a well known filler, calcium carbonate (CaCO$_3$). In one set of test samples, ten grams of CaCO$_3$ were added to 70 milliliters of distilled water to form each sample. In the other set, ten grams of CaCO$_3$ were added to 70 milliliters of 0.1M beta-alanine. Samples were then dried at 25° C. (ambient); heated to 250° C. in air for one hour; heated to 400° C. in air for one hour. Infra-red polymerization measurements showed a set of peaks characteristic of beta-alanine when the beta-alanine sample dried at 25° C. was examined. Otherwise, all samples showed identical readings that indicated complete removal of beta-alanine by heating.

For comparative purposes, infra-red polymerization studies were made on the heat treated products of Examples 33 and 34 above. In these materials, the sole polymerizing material was residual beta-alanine. The traces were produced with a Perkin Elmer 1800 computer enhanced, infra-red spectrophotometer and are shown in FIG. 1 of the drawing.

The infra-red measurements, as well as observed properties and chemical analyses, demonstrate retention of the functional organic compound. The measurements made on the Example 33 material after a 250° C. heat treatment are shown in a curve designated "250° C." in FIG. 1. Below that, but essentially identical in shape, is a curve based on data from the Example 34 material after a 400° C. heat treatment and designated "400° C.".

The peaks at 1656 and 1521 wave numbers, respectively designated as Amide I and Amide II, and the N-H bend at the 1430 wave number, signify retention of the organic.

EXAMPLES 41-45

A series of gels was prepared and treated in accordance with the procedures described for Examples 21-28. In each member of the series, the secondary additive was terephthalic acid with or without phenylenediamine. The basic gel was vermiculite dispersed in a beta-alanine solution, the solids' content being eight grams per hundred.

Table 7 lists the amount of secondary additive(s) in each composition:

TABLE 7

| Sample | Terephthalic acid added | Phenylenediamine added |
|---|---|---|
| 41 | 10 ml. of 5% solution | 3 ml. of 10% solution |
| 42 | 10 ml. of 5% solution | 1 ml. of 10% solution |
| 43 | 10 ml. of 5% solution | 3 ml. of 10% solution |
| 44 | 1 ml. of 5% solution | — |
| 45 | 5 ml. of 5% solution | 5 ml. of 10% solution |

Each sample was then treated in a different manner to produce a solid body. Example 42 was dried at 25° C. Examples 41 and 45 were thermally polymerized by heating one hour at 100° C. followed by one hour at 400° C. Examples 43 and 44 were given the same thermal cycle, except that the second hour was at 250° C., rather than 400° C., in each case.

The bodies thus produced were tested to determine Young's modulus and tensile strength, and were chemically analyzed for carbon and nitrogen contents. The data determined are set forth in Table 8. Young's modulus (Mod.) is the value given multiplied by $10^6$ psi, tensile strength (T.S.) is in psi, and carbon (C) and nitrogen (N) are in percent by weight.

TABLE 8

| Sample | Mod. ($\times 10^6$ psi) | T.S. (psi) | C (%) | N (%) |
|---|---|---|---|---|
| 41 | 5.66 | 10,144 | 4.68 | 1.16 |
| 42 | 6.82 | 5,430 | 5.42 | 1.70 |
| 43 | 7.85 | 9,464 | 5.10 | 1.55 |
| 44 | 6.88 | 6,760 | 2.42 | 0.75 |
| 45 | 6.45 | 9,384 | 4.34 | 1.24 |

EXAMPLES 46-49

A further series of gels was prepared employing autoclave-synthesized lithium hectorites available from Laporte Industries Limited under the designations Laponite 825 and Laponite 127. Each gel was prepared by placing ten grams of the phyllosilicate in 100 ml. of a 0.1M solution of a primary aminocarboxy acid and agitating for a few minutes.

Table 9 shows, by the supplier's number, the phyllosilicate employed. The aminocarboxy acid employed is indicated by name:

TABLE 9

| Example | Phyllosilicate | Acid |
|---|---|---|
| 46 | 825 | beta-alanine |
| 47 | 127 | beta-alanine (0.3 M) |
| 48 | 127 | 4-aminobutyric |
| 49 | 127 | glycine |

A sample of each gel was poured onto a flat surface and dried at ambient temperature, except for Example 48 which was dried at 80° C. under a vacuum of 29" mercury. A second sample of each was spread onto a flat plate and heat treated under vacuum of 29" mercury. Examples 46 and 47 were heated at 200° C. for four (4) hours, while Examples 48 and 49 were heated at 200° C. for two (2) hours. In each instance, the solid film product was transparent. This indicates the synthetic material is dispersed in very finely divided form in the film.

The phyllosilicates showed carbon (C) and nitrogen (N) contents on the order of 0.1% or less as received. The contents of C and N, in weight percent, as shown by analysis, are detailed in Table 10.

TABLE 10

| Example | Treatment | C (%) | N (%) |
|---|---|---|---|
| 46 | dried | 10.7 | 4.3 |
| 47 | dried | 9.5 | 3.7 |
| 48 | 80° C. | 4.6 | 1.3 |
| 49 | dried | 2.7 | 1.5 |
| 46 | 4 hr. at 200° C. | 12.1 | 4.4 |
| 47 | 4 hr. at 200° C. | 3.5 | 1.1 |
| 48 | 2 hr. at 200° C. | 4.8 | 1.3 |
| 49 | 2 hr. at 200° C. | 3.3 | 1.7 |

The analyses show both sustained retention of organic in the polymerized product and an overwhelming amount of inorganic in a transparent film.

BRIEF DESCRIPTION OF THE DRAWINGS

FIG. 2 shows a scanning electron micrograph taken at 10,000X magnification of a polished vermiculite material as it was received from the supplier. The flaky, layered appearance is typical.

Figure 1:
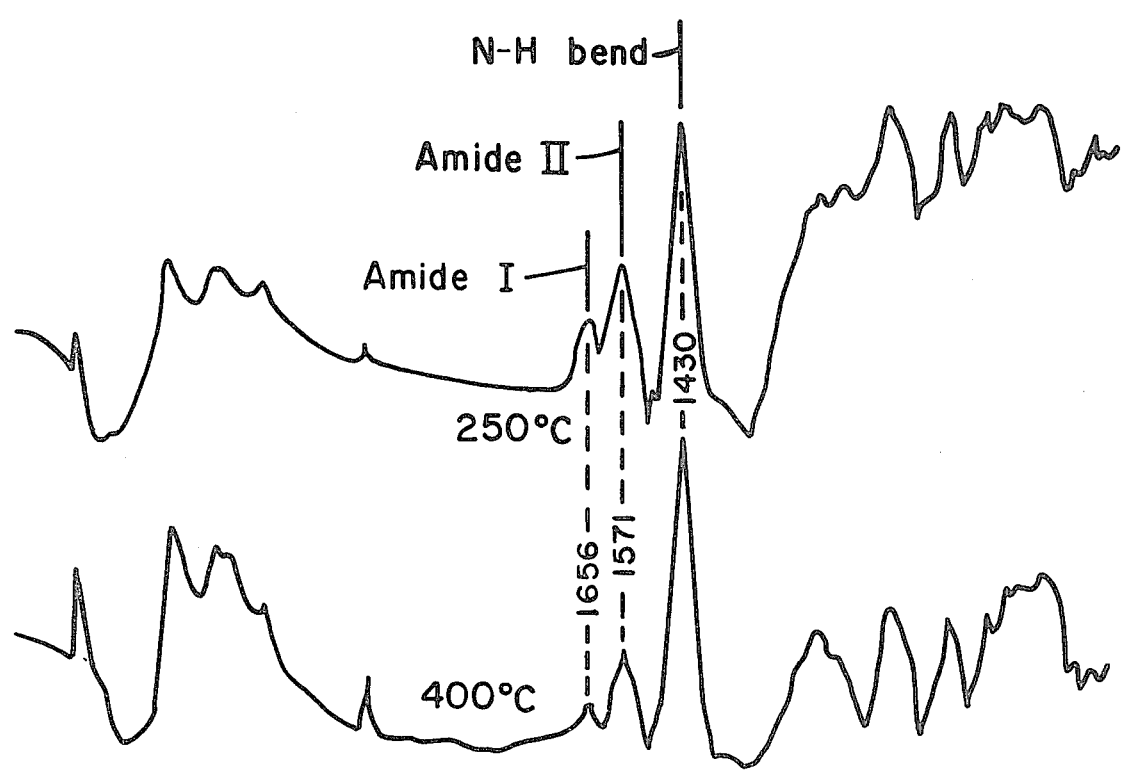
FIG. 1 is a graphical illustration of infra-red measurements as previously described. The curves are plotted from infra-red spectrophotometer data and run from left to right. The vertical axis indicates degree of action and the horizontal axis indicates wave number.
Figure 2:
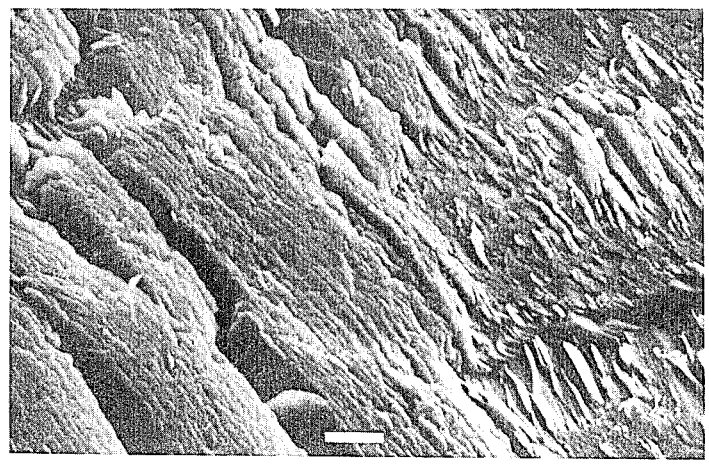
FIGS. 2, 3 and 4 are scanning electron micrographs obtained with a Model 1400 D scanning electron microscope supplied by Advanced Metals Research Corp. (AMR). The FIGURES show, respectively, (2) a vermiculite sample before treatment, (3) a polymerized sample of a vermiculite gel, and (4) an expanded sepiolite material as disclosed in Example 13.
Figure 3:
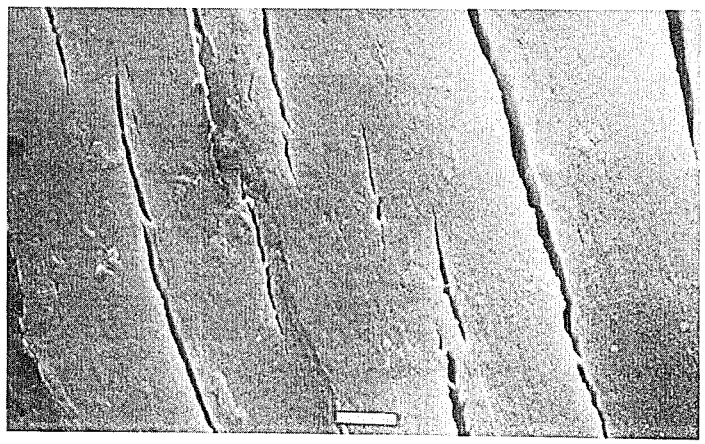

The material shown in FIG. 2 was then treated as disclosed in Example 8. The resulting gel was then polymerized by heating at 400° C. for one hour. A sample of the polymerized gel was then polished and a 10,000X magnification, scanning electron micrograph taken. This is shown in FIG. 3 which illustrates the tight structure achieved by reconstitution of the vermiculite.

Figure 4:
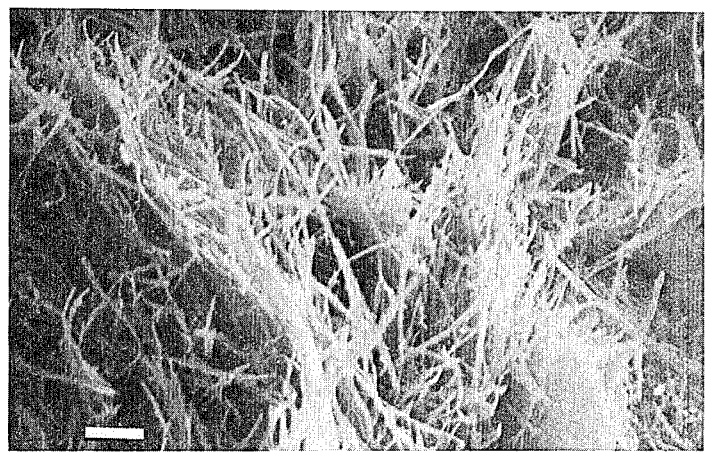

By way of contrast, FIG. 4 shows a 10,000X magnification, scanning electron micrograph of a sepiolite gel prepared in accordance with Example 13. The characteristic chain or fibrous structure of sepiolite is apparent. It is evident that interesting characteristics can result if phyllosilicates such as vermiculite and sepiolite are mixed by joint gel formation and then polymerized or otherwise reconstituted.

EXAMPLE 50

The procedure described in Example 1 was repeated with the beta-alanine solution being replaced with an 11% aqueous solution of N-glycylglycine, a simple dipeptide having (—NHCO—) peptide linkages. A stable gel was produced in which the original lattice spacing of the vermiculite had been expanded to 67 Å.

EXAMPLES 51-54

In this set of examples Nos. 51 and 52 comprised control samples; that is, they consisted of South African vermiculite samples to which no expanding agent was added. They were, however, subjected to a severe shearing force in a vibramill marketed by Tema, Inc., Cincinnati, Ohio, under the designation Siebtechik Type SM-6, VM. Thus, Example 51 was milled for one hour and Example 52 for 12 hours.

Example 52 comprised a sample consisting of 10% by weight dry beta-alanine, 90% by weight South African vermiculite. Example 53 was vibramilled for one hour.

Example 54 provides a comparison with Example 53. Hence, Example 54 comprised a sample consisting of South African vermiculite combined with a 10% aqueous solution of beta-alanine. Example 54 was vibramilled for one hour followed by milling for 10 minutes in a Kady mill, a relatively low energy shear mixer marketed by Kinetic Dispersion Corporation, Scarborough, Me.

The average particle size (in microns) of each of the five samples was measured and is reported in Table 11 in terms of the size of at least one-half of the sample particles. Lattice values of the treated crystals were measured again, utilizing low angle x-ray diffractometry, and are recited in Table 11 in terms of Å.

TABLE 11

| Example | Particle Size | Lattice Value |
|---|---|---|
| 51 | 39 | 14.6 |
| 52 | 22 | 14.6 |
| 53 | 8 | 21.0 |
| 54 | 6.2 | 21.5 |

A comparison of Examples 53 and 54 clearly indicates that the use of a dry expanding agent can be equally effective in delaminating the phyllosilicate and expanding the lattice thereof. It is also apparent from Examples 51 and 52 that the use of high energy shearing action alone is ineffective; an expanding agent must be present.

EXAMPLE 55

A sample consisting of 40 grams of South African vermiculite and 16 grams of dry beta-alanine was charged into a Waring blender and mixed together therein for five minutes. Somewhat more than one-half of the vermiculite exhibited a lattice value in the neighborhood of 20 Å. Thus, even the low energy shearing action of a food blender can be effective in delaminating the phyllosilicate and expanding the lattice thereof. Higher energy shearing action, however, appears to increase the rate of delamination.

I claim:

1. An article of manufacture composed of a gel in dried and polymerized form consisting essentially of at least one delaminated hydrated or hydratable phyllosilicate combined with a lattice expanding agent selected from the group consisting of a primary aminocarboxy acid, lysine orotate, and glycylglycine, at least a portion of said lattice expanding agent being intercalated in the lattice of said phyllosilicate.

2. A molded article of manufacture in accordance with claim 1.

3. A film in accordance with claim 1.

4. An article of manufacture in accordance with claim 1 wherein the phyllosilicate constituent is selected from the group consisting of vermiculite, sepiolite, sodium montmorillonite, and synthetic hectorite.

5. An article of manufacture in accordance with claim 1 consisting essentially of a phyllosilicate component and a polymerized primary aminocarboxy acid constituent.

6. An article of manufacture in accordance with claim 1 wherein said phyllosilicate is selected from the group consisting of a mixture of natural phyllosilicates, a mixture of synthetic phyllosilicates, and a mixture of natural and synthetic phyllosilicates.

7. An article of manufacture in accordance with claim 1 wherein said gel contains an additive of a polymerizable material or agent selected from the group consisting of an organic compound, an inorganic compound, and mixtures of an organic and an inorganic compound, at least a portion of which is present in the interlayer of said phyllosilicate.

8. An article of manufacture in accordance with claim 7 wherein said organic compound is selected from the group consisting of melamine, guanidine, amides, tertiary and quaternary amines, silanols, caprolactams, epoxides, phenolics, polyesters, polyvinyls, acrylates, methacrylates, phthalates, acrylamides, polysulfones, stearates, citrates, acetates, and cyanates.

9. An article of manufacture in accordance with claim 8 wherein said organic compound is selected from the group consisting of 4-aminobenzoic/$CH_3COOH$, E-caprolactam, polyvinyl acetate, octylamine, polyethylene terephthalate, and terephthalic acid+-phenylenediamine.

10. An article of manufacture in accordance with claim 7 wherein said inorganic compound is selected from the group consisting of nitrates, carbonates, chromates, sulfates, borates, halides, acid phosphates, and basic phosphates.

11. An article of manufacture in accordance with claim 10 wherein said inorganic compound is selected from the group of $K_2Cr_2O_7$, $(NH_4)_2HPO_4$, and a silver compound.

* * * * *